UNITED STATES PATENT OFFICE.

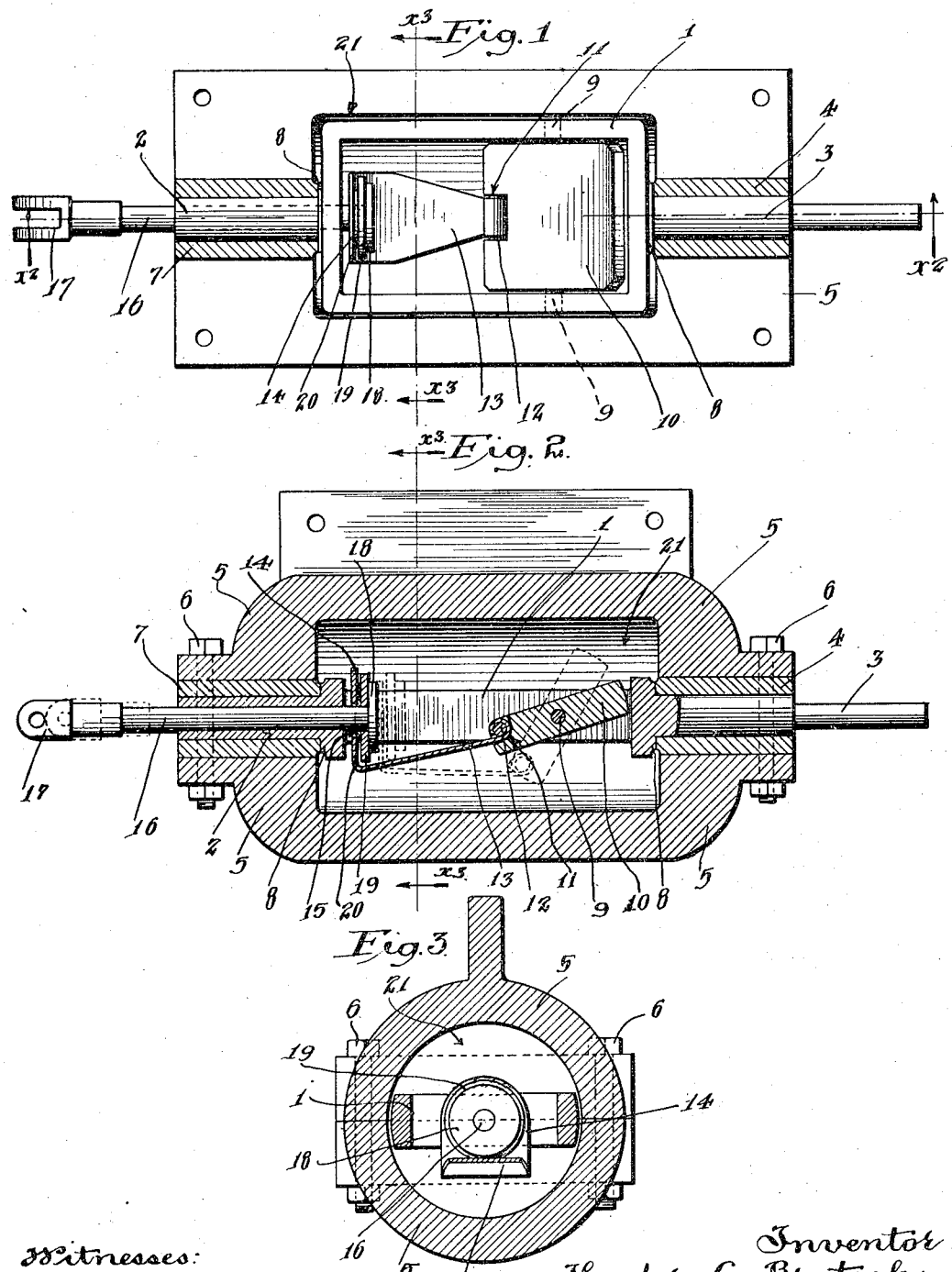

THEODORE G. BRATSCH, OF ORANGE, CALIFORNIA.

GOVERNOR.

1,290,704.  Specification of Letters Patent.  Patented Jan. 7, 1919.

Application filed May 28, 1918. Serial No. 237,050.

*To all whom it may concern:*

Be it known that I, THEODORE G. BRATSCH, a citizen of the United States, residing at Orange, in the county of Orange and State of California, have invented a new and useful Governor, of which the following is a specification.

This invention pertains to devices of the character designed to automatically regulate the speed of an engine. It is especially useful in connection with tractors since the dust created by the tractor cannot penetrate to the mechanism so as to injure the same.

An object of the invention is to produce a governor of comparatively simple construction and one that is reliable in operation.

Another object is to make a dustproof governor so that it will be durable in operation.

Other objects and advantages will appear in the subjoined detail description.

The accompanying drawings illustrate the invention.

Figure 1 is a side elevation of a governor built in accordance with this invention, one section of the housing being removed and the bearings being shown in midsection.

Fig. 2 is an inverted plan section on line indicated by $x^2$—$x^2$, Fig. 1.

Fig. 3 is a sectional elevation on line indicated by $x^3$—$x^3$, Figs. 1 and 2.

There is provided an open frame 1 which may be of rectangular shape or any other suitable shape and the frame is provided at its ends with shafts 2, 3, respectively. In the instance shown in the drawings the shaft 3 is solid and is journaled in a bushed bearing 4 in one end of the housing which may comprise halves or sections 5 held together by bolts 6, or their equivalents. The shaft 2 is hollow or tubular in the instance shown in the drawings and is journaled in a bushed bearing 7 at the end of the housing 5, 5 opposite to the end having the bearing 4. Thus the frame 1 is free to revolve and may be turned by driving the shaft 3 as is readily understood. The frame 1 may be provided with bosses 8 to bear against the inner ends of the bearings so as to prevent or minimize end play of the frame.

Carried by the frame 1 and pivoted thereto at 9 is a flat weight 10, the pivot 9 being substantially midway of the length of the weight. When the frame 1 is rotated, centrifugal action tends to move the weight into a position transversely of the frame 1 as shown in dotted lines in Fig. 2. The weight 10 is provided at one end with a notch 11, and a pin or pivot 12 extends across said notch. Pivoted in the notch by the pin 12 is one end of a link 13, said link having its other end bent at an angle to form an eye 14. The opening of the eye is indicated at 15 and said opening accommodates a rod 16 which extends through the hollow shaft 2 and is adapted to be connected by a suitable coupling 17, or its equivalent, to mechanism, not shown, for operating the throttle valve, or to any other mechanism that is to be controlled by the governor. The inner end of the rod 16 is provided with a head or shoulder 18, and, if desired, a fiber washer 19 and a metal washer 20 may be interposed between the head 18 and the eye 14. It is understood that the housing 5, 5 is stationarily mounted on a suitable support. In practical operation, assuming that the shaft 3 is connected to an operating engine, not shown, and that the rod 16 is connected to the throttle valve, not shown, of the engine, it is clear that rotation of the shaft 3 will swing the weight 10 and link 13 into the positions shown in broken lines in Fig. 2 so as to pull the rod 16 inward. The connection between the rod 16 and throttle valve will be such as to cause the throttle valve to be moved toward closed position when the rod 16 is moved inward thus to diminish the speed of the engine. As soon as the speed of the engine decreases the throttle valve spring, not shown, tending to open the throttle valve, draws the rod 16 outward so as to swing the weight 10 toward the position shown in solid lines in Fig. 2. Thus the weight 10 works against the pull of the throttle valve spring or any other spring that may be provided for the purpose of retracting the weight 10. It is desirable to place a lubricant in the chamber 21 formed by the housing 5, 5, and such lubricant lubricates the various parts of the mechanism in the chamber 21 and also lubricates the shaft journals. The centrifugal action causes outward pressure of the lubricant so as to effectually prevent the entrance of any dust whatsoever into the chamber 21 and into the bearings 4, 7.

From the foregoing it is clear that the governor described above is of very simple construction and is especially useful in connection with tractor engines since the parts of the governor are well protected from dust and dirt which are liable to be present in large quantities because of the character of the work often done by the tractor, as, for instance, the plowing or other preparation of land for crops.

I claim:

1. A governor comprising an open frame having shafts at its ends, one of the shafts being tubular, bearings for the shafts, a weight pivoted in said frame, a link pivoted to the weight and provided with an eye, and a rod extending through the hollow shaft and through the eye and provided on its inner end with a head.

2. A governor comprising a housing having bearings at its ends and forming a chamber, an open frame in the chamber having shafts at its ends journaled in the bearings, one of the shafts being tubular, a weight pivoted in said frame, a link pivoted to the weight and provided with an eye, and a rod extending through the hollow shaft and through the eye and provided on its inner end with a head.

Signed at Los Angeles, California, this 22d day of May, 1918.

THEODORE G. BRATSCH.

Witnesses:
GEORGE H. HILES,
L. BELLE WEAVER.

Copies of this patent may be obtained for five cents each, by addressing the "Commissioner of Patents, Washington, D. C."